Figure 1:
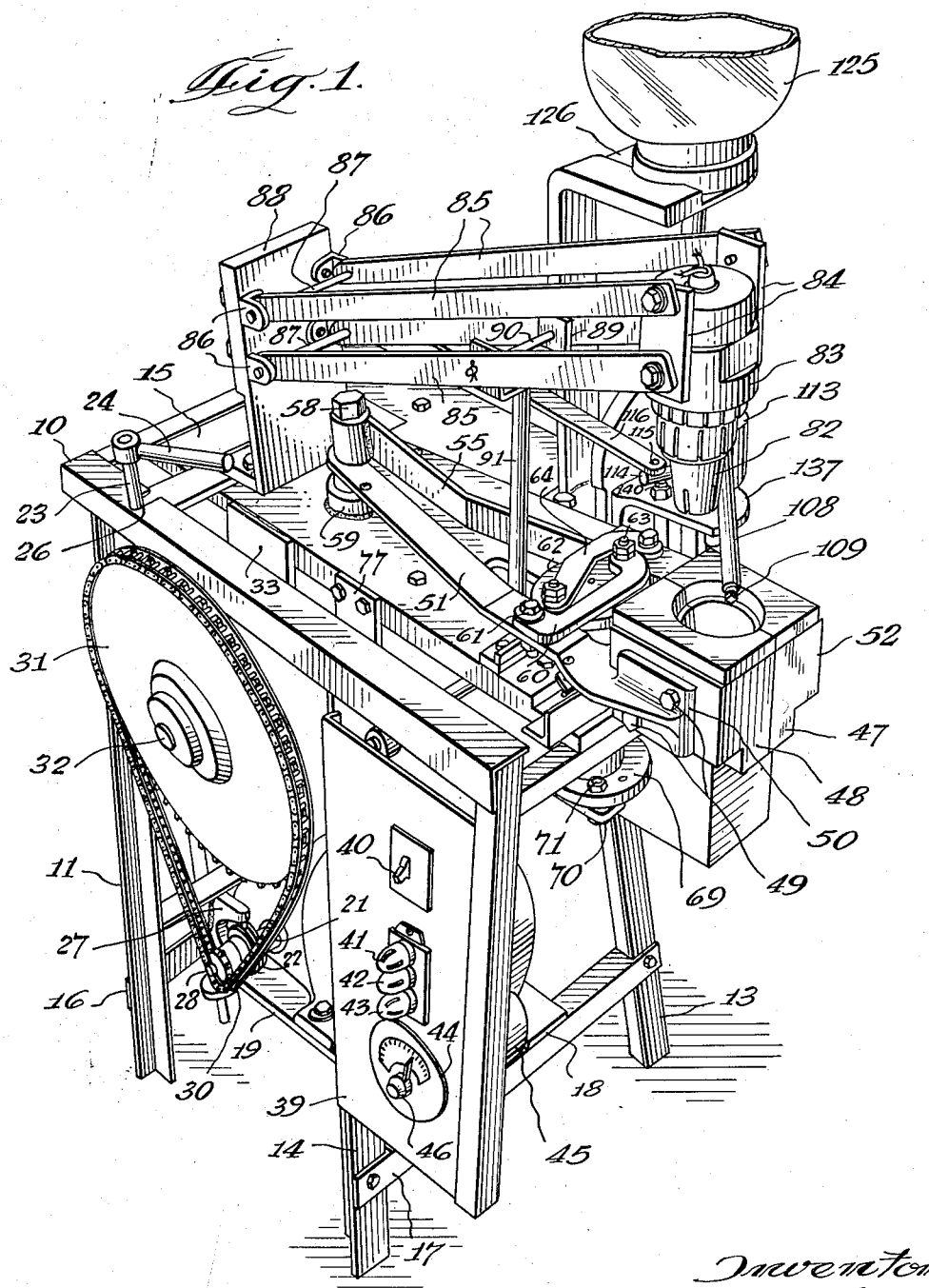

Jan. 15, 1957 C. J. HALSET 2,777,404
MACHINE FOR BAKING EDIBLE CUPS
Filed May 17, 1952 9 Sheets-Sheet 1

Inventor
Christ J. Halset
By Dawson & Ooms
Attorneys

Jan. 15, 1957   C. J. HALSET   2,777,404
MACHINE FOR BAKING EDIBLE CUPS
Filed May 17, 1952   9 Sheets-Sheet 2

Jan. 15, 1957

C. J. HALSET 2,777,404

MACHINE FOR BAKING EDIBLE CUPS

Filed May 17, 1952

9 Sheets-Sheet 4

Inventor
Christ J. Halset
By Dawson & Ooms
Attorneys

Jan. 15, 1957    C. J. HALSET    2,777,404
MACHINE FOR BAKING EDIBLE CUPS
Filed May 17, 1952    9 Sheets-Sheet 5
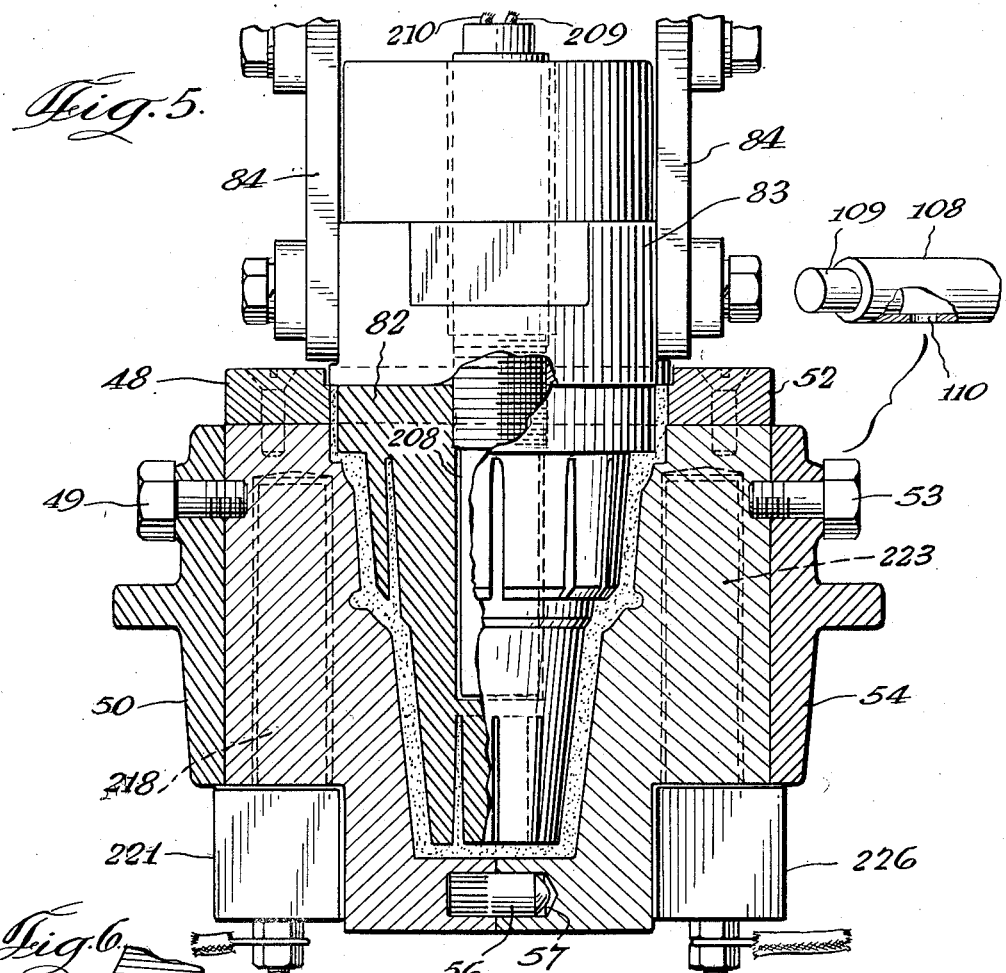
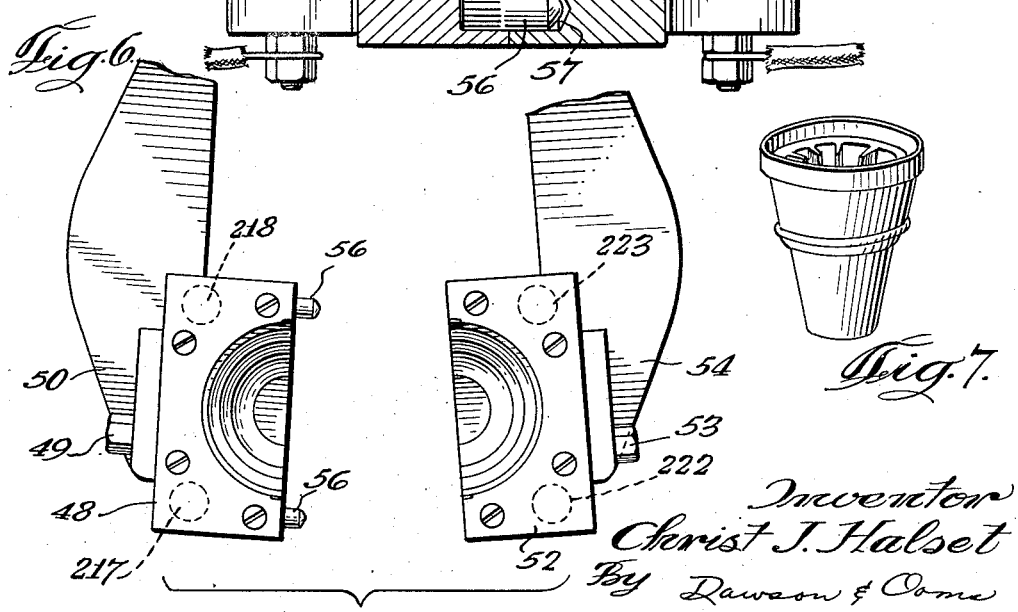
Inventor
Christ J. Halset
By Dawson & Ooms
Attorneys

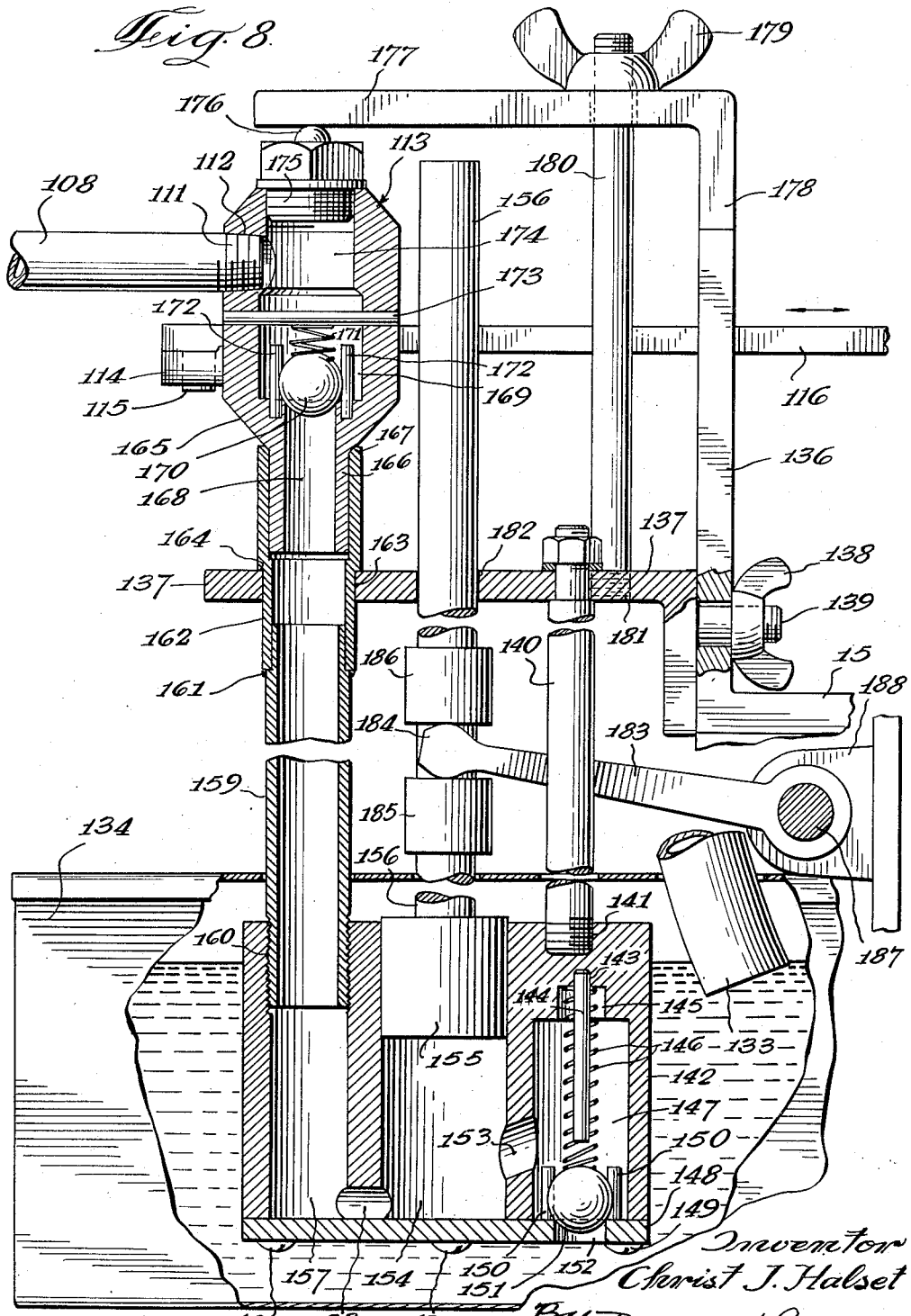

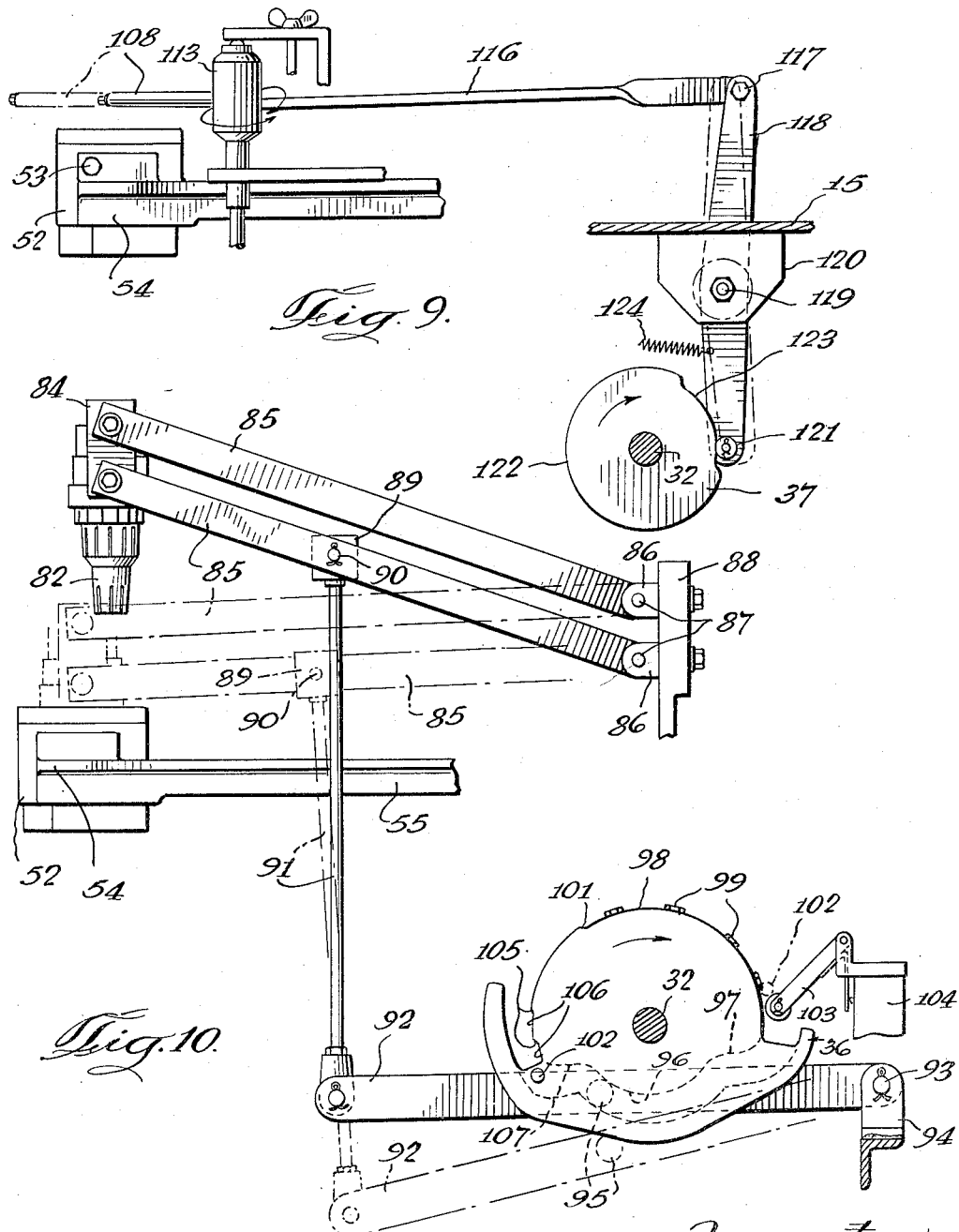

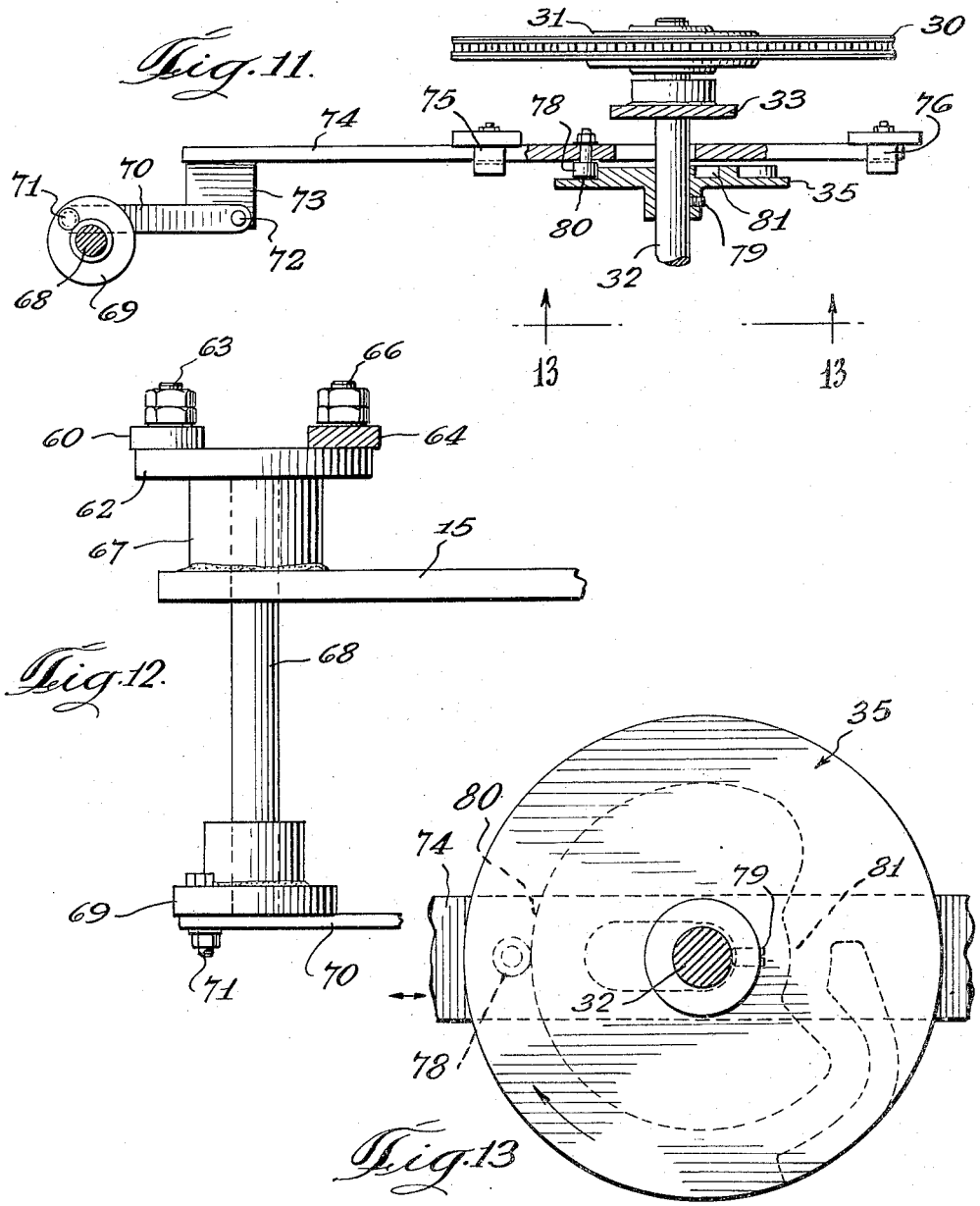

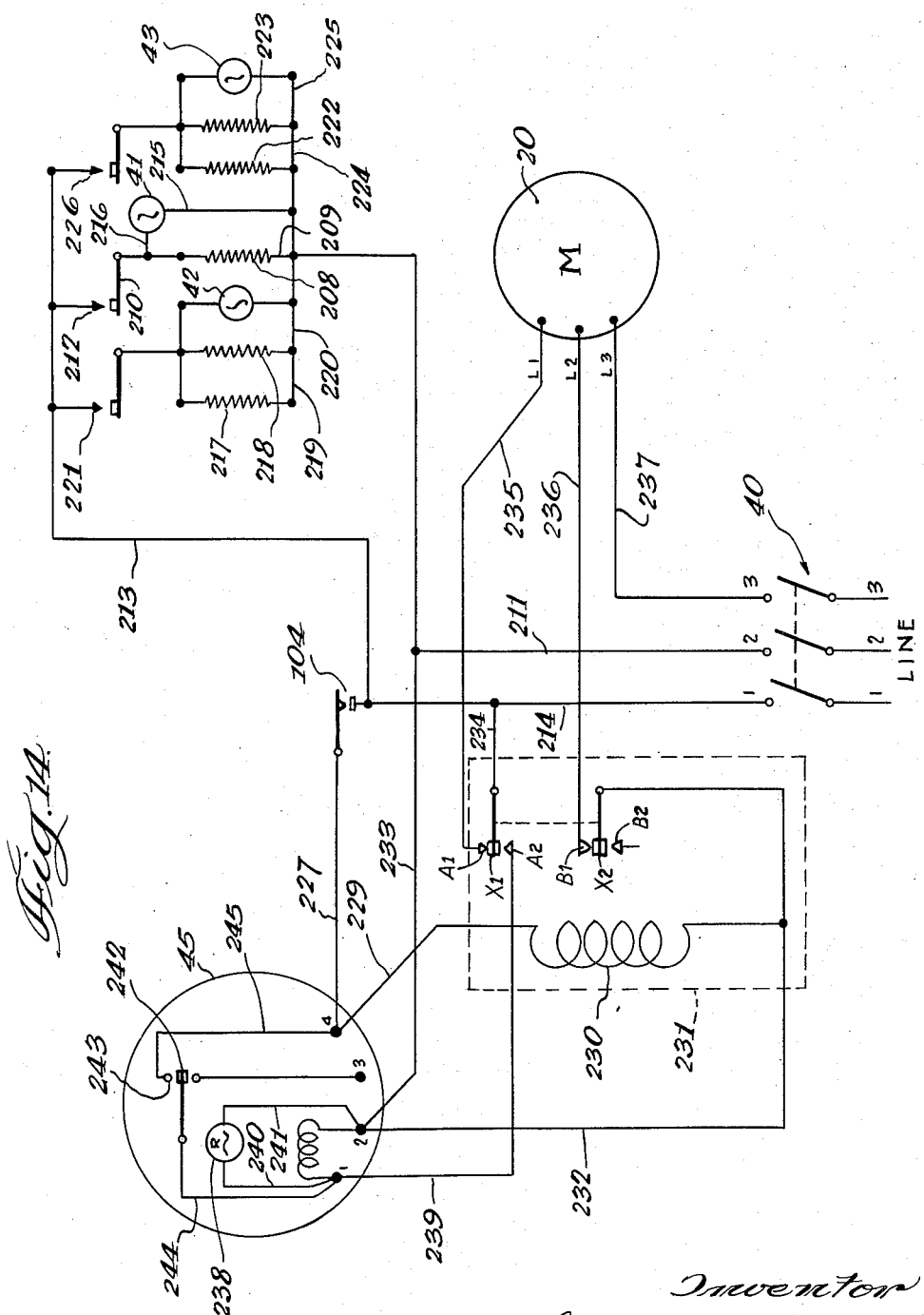

United States Patent Office 2,777,404
Patented Jan. 15, 1957

2,777,404

MACHINE FOR BAKING EDIBLE CUPS

Christ J. Halset, Chicago, Ill., assignor to Ideal Machine Co. Inc., Chicago, Ill., a corporation of Illinois Application May 17, 1952, Serial No. 288,493

5 Claims. (Cl. 107—66)

This invention relates to machinery adapted automatically to form and bake foods, particularly of the class of edible cups including the "cones" in which confections, such as ice cream, are served. These cups must be inexpensive to the retail consumer. They are very light in weight, occupy considerable packing space, and are preferably served when fresh and crisp rather than stale and tough. Their packaging and distribution are continuing problems.

The retailer of these cups faces a critical inventory question. He must maintain a sufficient supply to handle the large business of a sultry summer day, but this supply must be related to the temporary slump which he may experience during a period of unexpected bad weather.

A severe limitation exists in present commercial cup-baking machines in that they will not produce cups containing a high percentage of ingredients which tend to stick to the mold. These ingredients include items such as sugar, milk solids, chocolate, and others which may be desirably included in these edible cups. Another limitation of such machines resides in the effect of changing atmospheric conditions on the product and the general efficiency of the machine.

The present invention resides in the provision of a small, relatively inexpensive, machine which may be operated by the retailer in or adjacent to his retail outlet. This machine will automatically produce the usual cups on demand, as well as cups made from a variety of different formulae. With the thermostatically controlled electrically heated molds of this machine, it is possible to use a batter containing large amounts of sugar, milk solids, chocolate, and other foods without having the batter stick to the mold, and without using excessive amounts of grease to prevent such sticking. Additionally, changing atmospheric conditions do not adversely affect the product or the efficiency of the machine.

It is therefore an object of this invention to provide apparatus adapted to manufacture edible cups automatically.

A further object is to provide apparatus in which electrical power is employed for mechanical operation, to control the cycling, and to heat the mold members.

Figure 2:
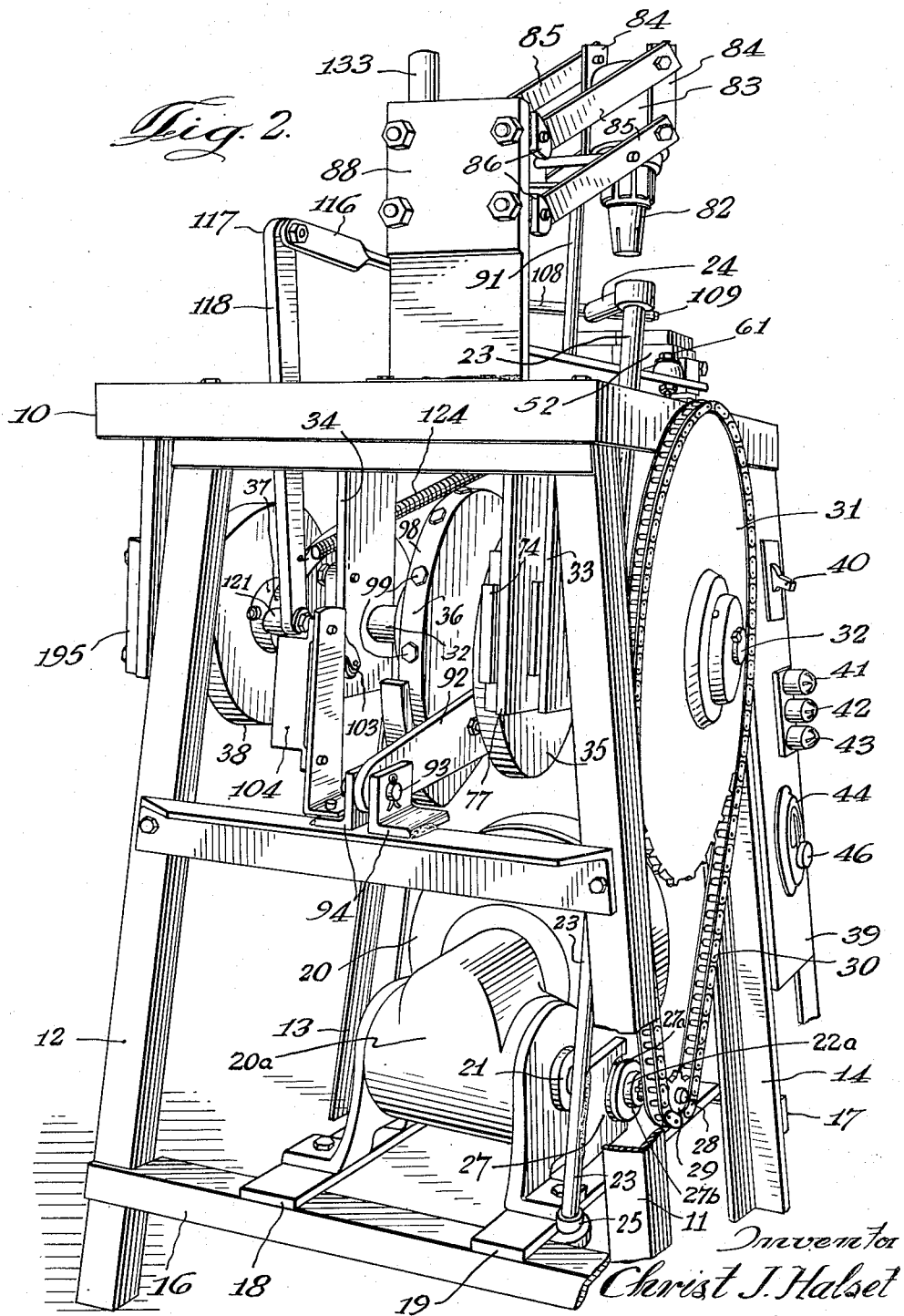
Figure 3:
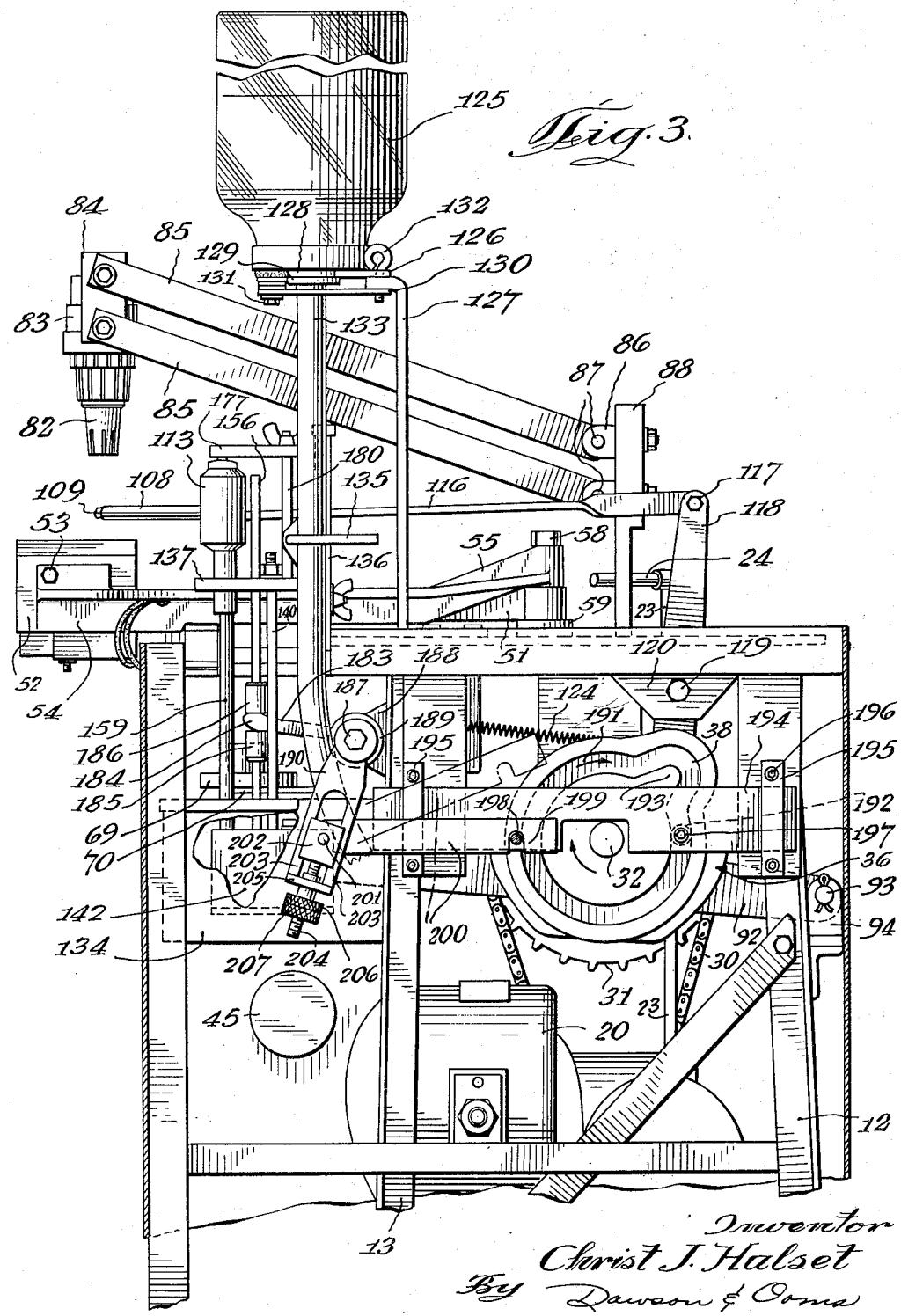
Figure 4:
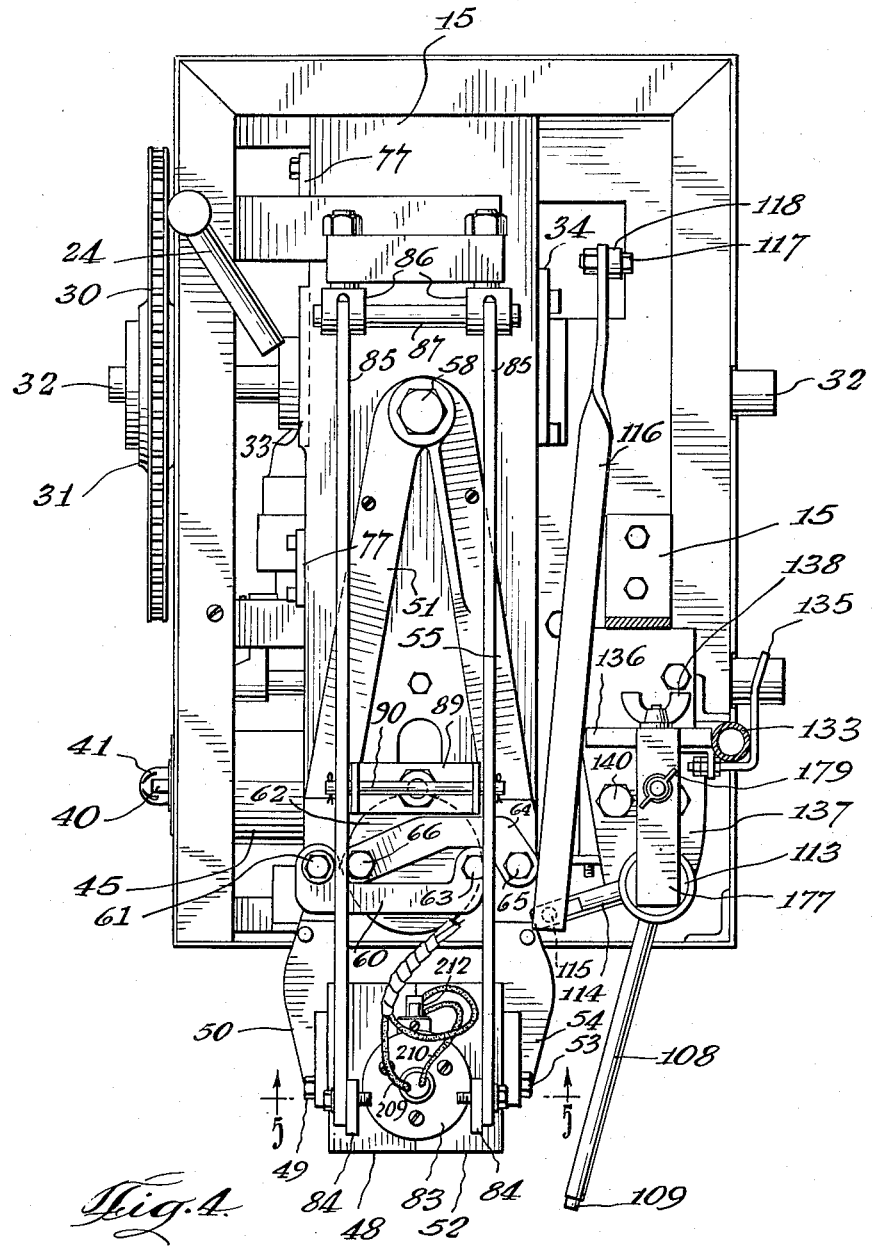

Further objects and advantages will be apparent from a consideration of the following specification and the accompanying drawings in which, Fig. 1 is a perspective view of the mold end of the cup-making machine, the mold being in the batter-receiving position, Fig. 2 is a perspective view of the opposite end of the machine with the mold in the batter-receiving position, Fig. 3 is a view in elevation of the rear of the machine, showing the mold in the batter-receiving position, Fig. 4 is a top plan view with the mold in the baking position and the batter storage receptacle removed, Fig. 5 is a view partially in cross section of the details of the mold and the batter injecting arm, Fig. 6 is a plan view of the two mold halves, shown in the open position, Fig. 7 is a perspective view of the cup formed by the mold shown in Figs. 5 and 6, Fig. 8 is a view in elevation and partly in section showing the details of the batter pump, Fig. 9 is a detail view in elevation of the batter injecting arm and the mechanism which moves it into and out of operative position, the other parts of the machine being omitted for clarity, Fig. 10 is a detail view in elevation of the mold core together with its supporting mechanism and the means for moving it into and out of operative position, the mold being shown in the withdrawn position in full line and in the baking position in dotted lines, other parts of the machine being omitted for clarity, Fig. 11 is a plan view of the detail of the cam and some of the associated apparatus employed to operate the scissors frame on which the two halves of the mold are mounted, Fig. 12 is a view in elevation of the details of some of the mechanism employed to open and close the scissors frame, Fig. 13 is a plan view of the cam shown in Fig. 11, and Fig. 14 is a diagram of the circuit employed to control the cycling of the machine.

The cup manufacturing machine shown in the accompanying drawings and hereinafter described is fitted with a single cavity mold, which restricts its production to one edible cup at a time.

General description

The subject cup-making machine is constructed like a table 10 having a number of legs 11, 12, 13 and 14 which support a top platform 15 to in turn support most of the operating equipment of the machine.

The cross braces 16 and 17 are attached respectively to the legs 11, 12 and 13, 14 and support the motor table members 18 and 19. The motor 20 is mounted on the members 18 and 19 and drives the power shaft 21 through the speed reducer 20a. The shaft 21 turns at a greatly reduced speed from that of the motor 20, and rotates the driving element of the clutch 22 at that speed (60 to 100 R. P. M.). The clutch 22 is a simple locking clutch of the slot and tongue type and is not a friction type clutch. The driven element 22a of the clutch is mounted on the splined portion of the shaft 28, and is connected, through the pins 27a and the ring 27b to the yoke 27. The clutch operating shaft 23 has, at its upper end, an actuating handle 24, situated above the table top 15. The shaft 23 is journaled at its lower end in the bearing 25 and at its upper end in an aperture 26, whereby reciprocating movement of the handle 24 will be transmitted through the shaft 23 to the clutch yoke 27 as desired. The power shaft 28 which is driven by the clutch 22 is fitted with a small sprocket 29 which drives a chain 30, in turn operatively associated with a large sprocket 31. The sprocket 31 is splined, as shown, on the main driving shaft 32 which is supported in bearings carried by the plates 33 and 34 which are in turn supported by the platform 15. The shaft 32 is fitted with a plurality of rotary cams which, through suitable cam followers and associated levers, perform the mechanical movements in the machine. These are the scissors jaw operating cam 35, the parallelogram operating cam 36, the feeder arm moving cam 37 and the pump actuating cam 38.

A control panel 39 is mounted on the table 10 adjacent the gear 31 and supports the main switch 40, the telltale lights 41, 42 and 43, and the front face 44 of the timer 45, including the adjustment arm 46 by means of which the length of the baking cycle can be regulated.

A decorative housing, not shown, may be employed to enclose the entire structure, with the exception of the mold and the batter tank, thus giving the machine an appearance which will permit its operation in places where it can be seen by the public.

Structure and operation of the mold halves

The mold 47 includes a mold half 48 mounted by means of the bolts 49 at the outer end 50 of a jaw arm 51. The mating mold half 52 is mounted by means of the bolt 53 in the outer end 54 of a second jaw arm 55. A pair of aligning pins 56 cooperate with the mating sockets 57 to assure proper alignment of the mold halves 48 and 52 when they are in the baking position.

The stud 58 is mounted in a bushing 59 on the table 15 and supports the jaw arms 51 and 55 for pivotal movement. The crank arm 60 is pivotally mounted on the arm 51 by the stud 61 and on the plate 62 by the stud 63 in such a manner as to support the outwardly extending arm 51 and to translate rotary movement of the plate 62 into horizontal reciprocating movement of the arm 51. Similarly the crank 64 is pivotally mounted on the arm 55 by the stud 65 and on the plate 62 by the stud 66 so as similarly to support the arm 55 and to impart reciprocating horizontal movement thereto. The plate 62 is supported on a bearing 67, in turn resting on the platform 15, and is attached for movement with the shaft 68 which extends through the bearing 67. The shaft 68 carries the circular plate 69 to which is eccentrically attached the arm 70 at the stud 71. The mounting of the arm 70 at the stud 71 is pivotal, as is the mounting of the arm 70 at the stud 72 on the plate 73, which is supported by the arm 74. The arm 74 is mounted for reciprocating horizontal movement, being supported by the bearings 75 and 76 which are in turn supported by suitable hangers 77.

The arm 74 supports, by suitable mounting means, the cam follower 78 and responds in horizontal movement to the movement of the cam follower as it is actuated by the cam 35. The cam 35 which, as previously described, is mounted on the shaft 32 and secured for rotation therewith by some means such as the set screw 79, is shown in Fig. 13 as having a partially closed track. The generally arcuate portion 80 of the cam 35 causes the arm 74 to go to its forward position thereby rotating the plate 69 and the shaft 68 in a counterclockwise direction, which will give similar rotation to the plate 62, and draw the outer ends 50 and 54 of the arms 51 and 55 toward each other, thereby closing the two halves of the mold 47. This is the position of the parts as shown in Figs. 1, 4 and 11. The low side of the cam is indicated generally at 81 and, since it is an enclosed track at this point, positively moves the arm 74 to its retracted position, thereby imparting clockwise movement to the plate 69, the shaft 68 and plate 62, which will open the jaw arms 51 and 55 and therefore the two halves of the mold 47.

Supporting structure for the mold core

The mold core 82 is mounted in a head 83 which is in turn supported by a pair of brackets 84. Each of the brackets 84 is in turn pivotally mounted on a pair of arms 85 which are pivotally mounted on hangers 86 by means of the shafts 87, in turn supported by an upright 88 mounted on the platform 15. The supporting arms 85, the brackets 84 and the portions of the upright 88 together form a pair of parallelograms, and pivotal movement of these parallelograms around the fixed centers of the shafts 87 imparts movement to the core member 82 while holding it vertical, thereby obtaining the desired insertion of the core within the mold 47.

To impart this vertical movement to the parallelograms and therefore to the core 82 the U-shaped bracket 89 is attached to the lower pair of arms 85 by means of a tie-bar 90. The vertical arm 91 is attached to the bracket 89 and carries at its lower end a cam follower arm 92 which is pivotally mounted at 93 on the brackets 94. As shown in Fig. 10, pivotal movement of the arm 92 about the center 93 will impart motion in a vertical plane to the parallelogram, including the arms 85, and to the core 82.

A rotary cam follower 95 is pivotally supported on the arm 92 for engagement with the cam 36. As shown in Fig. 10, the cam rotates in a clockwise direction, and the cam follower 95 is in a cam track in the lower portion 96 of the cam 36 which causes the core 82 to be lifted from the mold 47. The lifting surface 97 of the cam 36 when engaged by the cam follower 95, depresses the arm 92 to the dotted line position of Fig. 10, thereby lowering the parallelogram and the core 82 into the dotted line position of Fig. 10. The face 98 of the cam 36 is provided with knobs, herein shown constituted by the heads of bolts 99. As the cam follower 95 responds to the intermittent up and down movement caused by the knobs 99, the core 82 is jiggled slightly in the mold 47. This permits the steam which is driven off the batter to escape from the mold 47, without which proper baking will not occur. The angularly disposed face 101 of the cam 36 moves the core 82 into its locked position for the baking portion of the cycle.

Soon after the cam follower 95 obtains the position required by the face 101, the pin 102 strikes the arm 103 as shown in the dotted line position of Fig. 10, thereby operating the microswitch 104, which starts the timer 45 and stops the motor 20, as will appear later. Even though the motor 20 stops quickly, the pin 102 clears the arm 103 before rotation of the cam 36 ceases. After the timer 45 has restarted the motor 20 and the mechanical operation of the machine, the cam follower 95 comes down the slopes 105 to the lands 106. This lifts the core 82 in stages a short distance out of the mold 47, providing a momentary drying of the cup prior to its being ejected from the mold 47, while leaving the cup in the mold. The mold 47 is opened, dropping the baked cup out. Then the cam follower 95 goes down the slope 107 and returns to the low portion 96, thereby completely lifting the core 82 away from the mold 47. The presence of the core 82 partially within the mold 47 at the time the baked cup is dropped, provides means for positively clearing the cup from the mold 47.

The lugs shown in Fig. 10 as extending from either end of the cam track are portions of the closed part of the cam track of the cam 36. The positive lifting and lowering action as required of this cam make necessary the closed cam track of the length shown.

Structure and movement of the batter feeding arm

The batter feeding arm 108 is shown as comprising a tube having a plug 109 at its free end. A discharge aperture 110 is formed in the lower portion of the tube near the plug 109. The opposite end of the tube 108 is threaded as at 111 and received in the aperture 112 defined in the rotatably mounted pump head 113. A crank arm 114 is attached by suitable means to the pump head 113 and defines near its free end an aperture to receive the pivotal mounting stud 115 of the actuating arm 116. It will be understood that horizontal reciprocating movement of the actuating arm 116 will cause rotary movement of the pump head 113, thereby moving the feeding arm 108 into and out of its feeding position.

The stud 117 provides a pivotal mounting between the actuating arm 116 and the cam follower supporting arm 118 which in turn is mounted for pivotal movement about the axis of the stud 119 engaged in the hanger 120, which is supported by the platform 15. A cam follower 121 is mounted by suitable means at the lower end of the arm 118 for engagement with the surface of the rotating cam 37. When the follower 121 is engaged by the high side 122 of the cam 37, the arm 118 moves into the dotted line position shown in Fig. 9 which rotates the feeder arm 108 to the withdrawn position. When the follower 121 is engaged by the low side 123 of the cam 37 the arm 118, under the urging of the spring 124, moves to the full line position of Fig. 9, which rotates the feeder arm 108 into the batter feeding position.

The cam 37, as shown in Fig. 9, rotates in a clockwise direction. Since the portion of the cycle which is devoted to the injection of the batter into the mold is of relatively short duration, the low portion 123 of the cam 37 is relatively small.

The batter feeding mechanism

In the embodiment shown in the drawings, particularly Fig. 3, the batter supply tank 125 is supported by a plate 126 which is in turn supported on an arm 127 mounted on the platform 15. The plate 126 is slotted at 128 to permit the horizontal withdrawal of the neck 129 of the tank 125. A locking arm 130 is attached by means of the pivot 131 under the plate 126, and held in position by the locking means 132 to prevent inadvertent removal of the tank 125. The batter is fed from the tank 125 through the flexible tube 133 into the hopper tank 134, the pivoted locking arm 135 being attached to the vertical supporting member 136 to hold the tube 133 in the desired position. The supporting bracket 137 is attached to the vertical member 136 by some means such as the wing nut 138 and stud 139, and the entire pumping mechanism is suspended therefrom by means of the bolts 140 which are threadedly engaged as at 141 in the pump body 142.

The removable mounting of the batter supply tank 125, the feeding tube 133, and pump, is provided to facilitate servicing and maintenance, since these are the portions of the machine which most often require attention.

The pump body 142 is formed with a bore 143 which furnishes a socket for the pin 144, a counterbore 145 which serves as a socket for the spring 146, and a further counterbore 147 which provides an inlet chamber. The cover plate 148 is held in position by the screws 149 and is provided with guide pins 150 which maintain the ball 151 centered in the inlet aperture 152. The pin 144 serves not only as a guide for the spring 146 but also as a stop to limit the movement of the ball 151. The passage 153 provides communicating means between the inlet chamber 147 and the pumping chamber 154 which is in turn fitted with a piston 155 mounted on a piston rod 156. Communication is provided between the pumping chamber 154 and the discharge chamber 157 by the passage 158.

The discharge tube 159 is threadedly received at 160 into the pump body 142, while the upper end of the tube 159 is preferably welded as at 161 into the supporting fitting 162. The support bracket 137 is provided with an aperture 163 in which the support fitting 162 is received, its being supported by the shoulder 164 which rests on top of the support bracket 137. The rotatably mounted pump head 113 has a tapered lower face 165 which terminates in a cylindrical portion 166. The seal between the pump head 113 and the support fitting 162 is accomplished at the open end 167 of the fitting 162. This seal must be liquid tight while permitting rotation of the pump head 113 with relation to the fitting 162.

The cylindrical portion 166 is bored to provide a passage 168 and is undercut to form a chamber 169 in which the ball 170, the spring 171, the guide pins 172 and the cross bar 173 function as a ball check valve. The upper chamber 174 is closed by the plug 175, in the top of which is mounted a ball bearing 176 for engagement with the clamp arm 177. The L-shaped clamp arm 177 is positioned with its one arm 178 bearing on the top of the vertical member 136, and is held in position by the engagement of the wing nut 179 and a threaded tie-rod 180 which is threadably connected at 181 to the horizontal support bracket 137. The horizontal support bracket 137 is also formed with a guiding aperture 182 through which the upper end of the connecting rod 156 projects.

In operation, batter in the tank 125 flows by gravity through the tube 133 into the hopper tank 134. The suction stroke of the piston 155 will lift the ball 151 from its seat and draw the batter into the receiving chamber 147 and the pumping chamber 154. The power or down stroke of the piston 155 will meet the resistance of the seated ball 151 and will force the batter through the passage 158 into the discharge chamber 157 and the tube 159. After a sufficient number of cycles, the down stroke of the piston 155 will force batter into the passage 158, temporarily unseat the ball 170 and pump the batter out into the feeding arm 108. After the pump and the supply line have been filled with batter, further down strokes of the piston 155 will cause a metered amount of batter to be ejected from the discharge aperture 110, while each upward or suction stroke of the piston 155 will refill the pump.

The pump actuating arm 183 is forked at its outer end 184 and there embraces the connecting rod 156 between the collars 185 and 186. The opposite end of the arm 183 is pivotally connected at the axle 187 to the bracket 188. The axle 187 is provided with a hub 189 which supports the crank 190 for pivotal movement about the center of the axle 187.

The pump operating cam 38, which rotates in a clockwise direction, is formed with a channel 191 in which the cam follower roller 192 operates. The cam 38 is roughly circular in shape and has a single high point 193 which moves the cam follower roller 192, as it engages the same, in a direction away from the crank 190 and then toward the crank 190. The slide bar 194 is mounted for horizontal reciprocating movement and guided by the straps 195 which are attached respectively to the legs 12 and 13. The slide bar 194 carries the cam roller 192 on the stud 197 and carries an additional stud 198 for operating engagement with the slot 199 in the lever arm 200. Reciprocating horizontal movement of the cam follower 192 will cause similar movement of the slide bar 194, the stud 198 and the lever arm 200.

The lever arm 200 has a pivotal attachment through the stud 201 to the adjustable block 202, which is slidably received within the forks 203 of the crank 190. The threaded adjustment member 204 is likewise attached to the block 202, and, through the medium of the face plate 205, the adjusting wheel 206 and the locking wheel 207, determines the position of the block 202, and therefore the stud 201, relative to the crank 190 and the axle 187.

It will be readily appreciated that the positioning of the block 202 closer to the axis of the axle 187 will shorten the lever arm of the crank 190. Since the stroke of the lever arm 200 is of unvarying length, the shortening of the crank 190 will increase the length of the stroke of the actuating arm 183 and increase the stroke of the piston 155, thereby forcing more batter through the pump and into the mold 47. Conversely, movement of the block 202 away from the axle 187 will, through the same leverage, cause less batter to be delivered to the mold 47.

In connection with certain operations of the cup-making machine, such as servicing or inspection, it may be desired to have the machine in partial operation while still preventing the movement of the batter feeder arm 108 into the injecting position, and while preventing the pumping of batter. To accomplish this result, the stud 115, which connects the arm 116 with the arm 114, is removably received within the latter so as to permit its easy disconnection and thereby the disabling of the movement of the arm 108. Likewise, the arm 200, being removably attached by means of the stud 198 to the slide bar 194, may be moved to the dotted line position shown in Fig. 3 thereby disabling the batter pumping mechanism. With these two functions disabled it is possible to operate the motor 20 and the driving mechanism for the shaft 32, which will permit the opening and closing of the mold 47 and the lowering and raising of the core 82.

Heating the mold and the core

A result obtained by combining the mechanical operation of the mold parts and the batter feeding mechanism, with electrical control of the baking period by means of a timer, and with electrical heating of the mold halves and the core is to produce edible cups of practically absolute uniformity. Each cup is uniformly baked throughout its length, and is of a uniform color, since it is not exposed to hot spots in the mold. This result is obtained by the positioning of the electrical mold-heating elements in relation to each other and in relation to the working surfaces of the mold members. Additionally, because of the close thermostatic control of the temperature of the mold members, each succeeding cup baked is a duplicate in color of the cups preceding it.

The electrical circuit shown in Fig. 14 is illustrative of circuits which can be employed in such a machine. The present embodiment is wired as there shown.

The mold members are heated by self-contained electrical heating elements which are mounted within the mold members. The element 208 is received centrally of the core 82 and is connected by the lead 209 directly to one lead 211 of the power source and by the lead 210, through a thermostatic element 212, and the lead 213 to another lead 214 of the power source. The telltale light 41 is connected in parallel with the heating element 208 by the lead 215 to the lead 211 and by the lead 216 through the thermostatic element 212 to the lead 214. The thermostatic element 212 is controllable and, after power is supplied to the system through the closing of the master switch 40, the thermostatic element 212 will control the temperature of the core 82. When the thermostatic element 212 breaks the power supply circuit, it not only cuts off the heating element 208, but also extinguishes the telltale light 41. This indicates to the user that the core 82 has reached proper baking temperature.

The mold half 48 has situated near its outer corners the heating elements 217 and 218 which are connected by the leads 219 and 220 to the lead 211 and are connected, through the thermostatic element 221 and the lead 213 to the lead 214. The telltale light 42 is connected in parallel with the heating elements 217 and 218 through the thermostatic element 221.

The mold half 52 contains, at its outer corners, the heating elements 222 and 223 which are connected through leads 224 and 225 to the lead 211, and through the thermostatic element 226 and the lead 213 to the lead 214. The telltale light 43 is connected in parallel with the heating element 222 and 223 through the thermostatic control 226.

When the heating elements 217, 218, 222 and 223 have brought the mold halves 48 and 52 to proper baking temperature, the thermostatic elements 221 and 226 will shut off the power supply to the heating elements and to the telltale lights 42 and 43, thereby notifying the user that the mold has reached baking temperature.

Control of the baking cycle

In the embodiment of the machine shown and described here, the period in which the baking of the cup takes place is approximately six times the duration of the period during which the movement of the mold parts, the batter feeding arm and the pump are accomplished by means of the operating cams. The controlling of the time of baking is accomplished by means of a variable timer device and a motor control relay. The relay is under control of the timer, which may be varied to accommodate variations in baking conditions and batter.

Referring again to Fig. 14, the microswitch 104, which is momentarily closed by the pin 102 on the cam 36, is a normally open switch, and is closed only to energize the circuits which stop the driving motor 20. The switch 104 is in a circuit from the lead 214 through the lead 227 to the No. 4 terminal of the timer 45, the lead 229, coil 230 of relay 231, lead 232, the No. 2 terminal of the timer 228, and the lead 233 back to the lead 211 of the power source. With this circuit, the closing of the microswitch 104 will energize the relay 231, which will pull the movable contacts X1 and X2 away from the motor contacts A1 and A2 and into contact with the lower contacts B1 and B2.

Power is supplied to the driving motor 20 from the lead 214, through lead 234, contacts X1 and A1, and lead 235, and from the lead 211, through the leads 233 and 232, contacts X2 and A2 and lead 236. The lead 237 is connected directly from the switch 40 to the driving motor 20. Breaking of the contacts X1—A1 and X2—A2 of course stops the motor 20.

During the momentary energization of the coil 230 by the closing of the microswitch 104, the contact X1 moves into contact with the contact B1, which provides a circuit for the timer motor 238 as follows: lead 214, lead 234, contacts X1 and B1, lead 239, No. 1 terminal, lead 240, motor 238, lead 241, No. 2 terminal, lead 233, and lead 211. The energization of this circuit starts the motor 238 which immediately closes the contacts 242—243, which completes a holding circuit for the coil 230, as follows: lead 214, lead 234, contacts X1 and B1, lead 239, No. 1 terminal, lead 244, contacts 242 and 243, lead 245, terminal 4, lead 229, coil 230, lead 232, No. 2 terminal, lead 233 to lead 211. This holding circuit is necessary to maintain the relay 231 energized, because the microswitch 104 is only momentarily energized, while it is desirable to keep the motor 20 inoperative for a considerable period of time.

At the conclusion of the timed cycle, as set by the adjustment arm 46 on the timer 45, the contacts 242—243 are opened, breaking the holding circuit for the coil 230 and allowing the contacts X1 and X2 to fall back into contact with the contacts A1 and A2, thereby restarting the driving motor 20. The timer motor 238 is shut off and the timer is reset for the next cycle.

The timer 45, the microswitch 104 and the relay 231 are standard components, and hence need not be described in further detail. Variations of the electrical circuits are of course possible, the one here being shown merely by way of illustration.

Sequence of operation

When the machine is first started, by closing the main switch 40, it is necessary first to permit the heating elements 208, 217, 218, 222 and 223 to raise the temperature of the mold halves 48 and 52 and the core 82 to that required for proper baking. To permit the heating elements to operate without moving the core 82, the mold halves 48 and 52, the batter feeding arm 108 or the pump, the clutch 22 is disengaged, by moving the operating handle 24, thereby preventing rotation of the main shaft 32. As soon as the mold members have reached baking temperature, the telltale lights 41, 42 and 43 will go out, indicating that such a condition exists.

During the warm-up period the tank 125 containing a supply of batter has been placed in position, and it is assumed that the pump and the associated conduits including the batter feeder arm 108 are filled with batter. When the mold portions have reached baking temperature, the clutch 22 is engaged and the machine enters the cycle. The mold halves 48 and 52 are brought together and the batter feeding arm is swung into the operative position, as shown in Fig. 1. The pump causes batter to be ejected from the nozzle 108 into the mold 47. The batter feeding arm 108 is then retracted to its inoperative position, during which time the pump also takes in additional batter. The mold core 82 is then lowered into the mold 47 and jiggled slightly to permit steam to be driven from the batter and out of the cavity.

The core is then locked into position, and further rotation of the cam 36 causes the pin 102 to close the microswitch 104 which stops the driving motor 20 and starts the baking period under control of the timer 45. At the close of the baking cycle, as determined by the adjustable timer 45, the driving motor 20 is again started.

The core 82 is lifted a short distance out of the mold 47, freeing it from the cup contained therein, but leaving it within the baked cup for most of its length. The mold halves 48 and 52 are then separated, any tendency to stick on the cup being defeated by the presence of the core 82 partially within the baked cup. The cup drops out of the mold into the hopper, not shown, the mold halves 48 and 52 are reclosed, and the cycle is repeated.

Having described my invention, what I claim as new and desire to protect by Letters Patent is:

1. In a machine for baking edible cups, the combination of a frame, a shaft mounted for rotation relative to said frame, power means adapted to rotate said shaft, a pair of mold halves together constituting a mold and mounted on said frame for reciprocating movement toward and away from each other, means connecting said mold halves and said shaft whereby rotation of said shaft will impart reciprocating movement to said mold halves, a mold core mounted for substantially vertical movement into and out of the mold constituted by said mold halves, means connecting said mold core and said shaft whereby rotation of said shaft will impart substantially vertical movement to said core with respect to said mold halves, a batter feeder arm mounted for movement toward and away from said pair of mold halves, means connecting said batter feeder arm and said shaft whereby rotation of said shaft will impart movement to said batter feeder arm toward and away from said pair of mold halves, a pump mounted on said frame and associated with said batter feeder arm and adapted to supply batter to said batter feeder arm, a batter supply tank adapted to supply batter to said pump, means connecting said pump and said shaft and adapted to operate said pump, electrically operated heating elements associated with said core and with said pair of mold halves, heat-responsive control elements associated with said heating elements and said core and pair of mold halves, a cut-off arm mounted for rotation with said shaft, a cut out switch mounted for actuation by said cut-off arm, and time-delay means operated responsive to the operation of said switch whereby rotation of said shaft is stopped for a predetermined period and then restarted.

2. In a machine for baking edible cups having a main frame and power means associated therewith, the combination of a mold formed by a pair of mold members which together define a cavity, said mold being mounted on said frame and adapted to be opened and closed, a core mounted on said frame and adapted to be moved into an out of the cavity defined by said mold, means associated with said power means and adapted to open and close said mold, means associated with said power means and adapted to move said core into and out of the cavity formed by said mold, a batter supply tank mounted on said frame, means associated with said power means and adapted to feed batter into said mold from said batter supply tank, a timer operatively associated with said power means whereby said power means is disabled for a predetermined period of time and then restarted, electric heating means associated with said core and with each of the mold members forming said mold, and heat control means responsive to the temperature in said core and said mold and adapted to maintain a substantially constant temperature therein.

3. In a machine for baking edible cups, the combination of a frame, a power shaft mounted on said frame for rotation relative thereto, a pair of mold halves together constituting a mold mounted on said frame for movement adapted to open the mold into the two separable halves, means actuated by said power shaft whereby said mold halves will be positively separated and rejoined, a core mounted for movement into and out of the cavity formed by said mold halves, means actuated by said power shaft whereby said core will be positively moved into and out of the cavity formed by said mold halves, a batter feeder arm mounted on said frame, a pump mounted on said frame and actuated by said power shaft, a batter supply tank mounted on said frame and adapted to supply batter to said pump and said batter feeder arm, electrically operated heating elements associated with said core and with said pair of mold halves, heat-responsive control elements associated with said heating elements and said core and pair of mold halves, and time-delay means operated responsive to the rotation of said power shaft whereby rotation of said shaft is stopped for a predetermined period and then restarted.

4. In a machine for baking edible cups, the combination comprising a frame, power means thereon, a mold mounted on said frame and including a pair of separable mold members which together define a mold cavity, means movably mounting said mold members on said frame for opening and closing said mold, a core mounted on said frame for movement into and out of said mold cavity, means for heating said mold and said core to a baking temperature, means cyclically operable by said power means for closing and opening said mold, means cyclically operable by said power means for moving said core into and out of said mold cavity while said mold is closed, a batter supply tank mounted on said frame, means cyclically operable by said power means for feeding batter from said tank into said mold cavity while said mold is closed and before said core is moved into said cavity, a timer, means cyclically operable by said power means for disabling said power means and initiating operation of said timer after said core is moved into said mold cavity, and means operable by said timer after a predetermined baking period for restarting said power means, said power means thereupon being effective to move said core out of said cavity and open said mold so as to discharge a baked cup therefrom.

5. In a machine for baking edible cups, the combination comprising a frame, power means thereon, a mold mounted on said frame and including a pair of separable mold members which together define a mold cavity, means movably mounting said mold members on said frame for opening and closing said mold, a core mounted on said frame for movement into and out of said mold cavity, means for heating said mold and said core to a baking temperature, means cyclically operable by said power means for closing and opening said mold, means cyclically operable by said power means for feeding batter into said mold cavity while said mold is closed, means cyclically operable by said power means for moving said core into and out of said mold cavity, a timer, means cyclically operable by said power means for disabling said power means and initiating operation of said timer with said mold closed and with the batter and said core in said mold cavity, and means operable by said timer after a predetermined baking period for restarting said power means, said power means thereupon being effective to move said core out of said cavity and open said mold so as to discharge a baked cup therefrom.

References Cited in the file of this patent

UNITED STATES PATENTS

| | | |
|---|---|---|
| 1,245,008 | Moore | Oct. 30, 1917 |
| 1,448,294 | Hauge et al. | Mar. 13, 1923 |
| 1,749,414 | Christianson | Mar. 4, 1930 |
| 2,180,061 | Lagrange | Nov. 14, 1939 |
| 2,563,866 | Puls | Aug. 14, 1951 |
| 2,715,372 | Whitsel | Aug. 16, 1955 |

FOREIGN PATENTS

| | | |
|---|---|---|
| 275,710 | Great Britain | Apr. 10, 1927 |